(12) United States Patent
Reasoner et al.

(10) Patent No.: US 7,505,261 B2
(45) Date of Patent: Mar. 17, 2009

(54) ELECTRICAL-OPTICAL SIGNAL CONVERSION FOR AUTOMATED STORAGE SYSTEMS

(75) Inventors: Kelly J. Reasoner, Fort Collins, CO (US); Gregg S. Schmidtke, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1196 days.

(21) Appl. No.: 10/804,318

(22) Filed: Mar. 18, 2004

(65) Prior Publication Data

US 2005/0207107 A1  Sep. 22, 2005

(51) Int. Cl.
*G06F 1/16* (2006.01)
*H05K 5/00* (2006.01)
*H05K 7/00* (2006.01)

(52) U.S. Cl. .................................................. 361/685
(58) Field of Classification Search .................. 361/685, 361/726, 683, 686
See application file for complete search history.

(56) References Cited

U.S. PATENT DOCUMENTS

| | | | |
|---|---|---|---|
| 5,041,924 A | 8/1991 | Blackborow et al. | |
| 5,687,039 A | 11/1997 | Coffin et al. | |
| 5,999,500 A | 12/1999 | Mueller | |
| 6,400,730 B1 | 6/2002 | Latif et al. | |
| 6,469,850 B2 | 10/2002 | Luffel et al. | |
| 6,476,999 B1 | 11/2002 | Meikle et al. | |
| 6,549,358 B1 | 4/2003 | Billy et al. | |
| 6,567,413 B1 | 5/2003 | Denton et al. | |
| 6,570,735 B2 | 5/2003 | Coffin et al. | |
| 6,607,344 B2 | 8/2003 | Ostwald | |
| 6,626,588 B1 | 9/2003 | Sasai et al. | |
| 6,650,803 B1 | 11/2003 | Ramaswami et al. | |
| 6,826,004 B2 * | 11/2004 | Albrecht et al. | 360/69 |
| 6,909,570 B2 * | 6/2005 | Ballard | 360/69 |
| 7,230,792 B2 * | 6/2007 | Schmidtke et al. | 360/98.06 |
| 2002/0089715 A1 | 7/2002 | Mesh et al. | |

* cited by examiner

*Primary Examiner*—Javaid Nasri

(57) ABSTRACT

Electrical-optical signal conversion for an automated storage system. In an exemplary implementation, an automated storage system comprises a plurality of storage cells for removable hard disk drives and a backplane including at least one electrical connection to connect the removable hard disk drives to the backplane. Transfer robotics are operable to access the removable hard disk drives in the storage cells and electrically connect the removable hard disk drives to the backplane via the at least one electrical connection. A backplane interface is operable to convert electrical data signals from the removable hard disk drives electrically connected at the backplane to optical signals for delivery to a system controller.

14 Claims, 7 Drawing Sheets

ELECTRICAL-OPTICAL SIGNAL CONVERSION FOR AUTOMATED STORAGE SYSTEMS

RELATED APPLICATIONS

This application contains subject matter related to co-owned U.S. patent application Ser. No. 10/717,794 for "MEDIA SELECTION SYSTEMS AND METHODS" of Gregg S. Schmidtke, et al. filed Nov. 19, 2003, now U.S. Pat. No. 7,230,792.

TECHNICAL FIELD

This invention relates to storage systems in general, and more specifically, to electrical-optical signal conversion for automated storage systems.

BACKGROUND

Mass storage systems are commercially available for storing large volumes of data on various types of storage media. For example, mass storage systems are widely available for storing data on magnetic tape cartridges. These mass storage systems are relatively inexpensive, rugged, and highly reliable for managing large quantities of data. Hard disk drive storage, while faster and often more reliable than tape storage, has typically been more expensive.

However, the cost of hard disk drive storage has dropped at the same time storage capacity has increased. Accordingly, hard disk drive storage has become a viable alternative to magnetic tape cartridges. For example, server computers are often configured with multiple hard disk drives, referred to as redundant arrays of independent disks (RAID) storage. RAID storage includes two or more hard disk drives with mirror copies of the data and provide fault tolerance and enhanced performance.

Electrical cables are typically used to connect the hard disk drives to the processor to support high data transfer rates. However, the high data transfer rates over electrical cables (currently around 1 GHz) results in electromagnetic interference (EMI) that may need to be shielded. In addition, the hard disk drives typically must be positioned in close proximity to the processor (e.g., within 18 inches for advanced technology attachment ATA hard disk drives) for data transfer, and the number of devices on the bus may be limited.

SUMMARY

An exemplary automated storage system comprises a plurality of storage cells for removable hard disk drives and a backplane including at least one electrical connection to connect the removable hard disk drives to the backplane. Transfer robotics are operable to access the removable hard disk drives in the storage cells and electrically connect the removable hard disk drives to the backplane via the at least one electrical connection. A backplane interface is operable to convert electrical data signals from the removable hard disk drives electrically connected at the backplane to optical signals for delivery to a system controller.

Another exemplary automated storage system comprises a drawer having a plurality of storage cells for removable hard disk drives, and a backplane provided adjacent the drawer. At least one electrical connection is mounted on the backplane, the electrical connection electrically connecting the removable hard disk drives to the backplane when the drawer is in a closed position. A system controller is optically coupled to the backplane. A backplane interface is operable to convert electrical data signals from the removable hard disk drives electrically connected at the backplane to optical signals for delivery to the system controller.

An exemplary method of operation comprises: electrically connecting a plurality of removable hard disk drives to a backplane in an automated storage system, optically coupling the backplane to a system controller, and converting electrical data signals from the removable hard disk drives electrically connected at the backplane to optical signals for delivery to the system controller.

DETAILED DESCRIPTION

Briefly, implementations of the invention enable hard disk drives to be used in an automated storage system even if the distance between the hard disk drives and the system controller exceeds the recommended distance for electrical data signal transmission. The electrical data signals are converted to optical signals, which support high data transfer rates over greater distances than electrical signals. In addition, the use of optical signals reduces electromagnetic interference (EMI) that may be generated by electrical signals. Optical signal conversion also allows any number of devices to be connected simultaneously, limited only by the connectivity provided. Alternatively, the electrical data signals may be converted to other formats, such as infrared (IR), radio frequency (RF), or high speed electrical signals. These and other implementations are described in more detail below with reference to the figures.

Exemplary System

Figure 1:
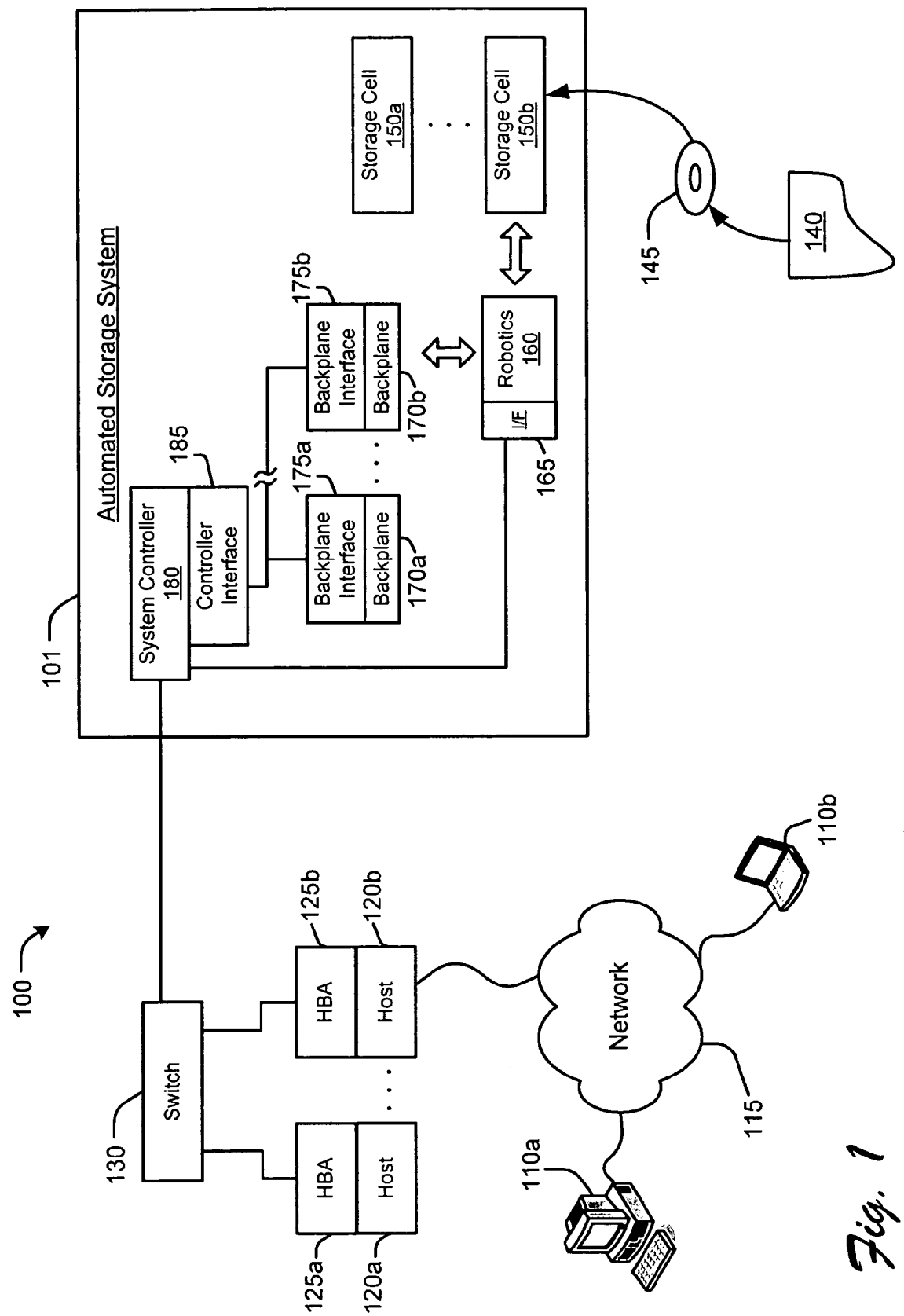
FIG. 1 is a schematic illustration of an exemplary implementation of an automated storage system in a storage network.

An exemplary storage area network (SAN), otherwise referred to as storage network 100, is shown in FIG. 1. The storage network 100 may be implemented in a private, dedicated network such as, e.g., a Fibre Channel (FC) switched fabric. Alternatively, portions of the storage network 100 may be implemented using public communication networks pursuant to a suitable communication protocol. Storage network 100 is shown in FIG. 1 including an automated storage system 101 which may be accessed by one or more clients 110a, 110b via one or more hosts 120a, 120b.

As used herein, the term "host" includes one or more computing systems that provide services to other computing or data processing systems or devices. For example, clients 110a, 110b may access the storage device 101 via one of the hosts 120a, 120b. Hosts 120a, 120b include one or more processors (or processing units) and system memory, and are typically implemented as server computers.

Clients 110a, 110b can be connected to one or more of the hosts 120a, 120b and to the storage system 101 directly or over a network 115, such as a Local Area Network (LAN) and/or Wide Area Network (WAN). Clients 110a, 110b may include memory and a degree of data processing capability at least sufficient to manage a network connection. Typically, clients 110a, 110b are implemented as network devices, such as, e.g., wireless devices, desktop or laptop computers, workstations, and even as other server computers.

As previously mentioned, storage network 100 includes an automated storage system 101 (hereinafter referred to as a "storage system"). Data 140 is stored in the storage system 101 on storage media, such as, e.g., hard disk drives 145.

The storage system 101 may be arranged as one or more libraries (not shown) having a plurality of storage cells 150a, 150b for the hard disk drives 145. The libraries may be modular (e.g., configured to be stacked one on top of the other and/or side-by-side), allowing the storage system 101 to be readily expanded.

Before continuing, it is noted that the storage system 101 is not limited to any particular physical configuration. For example, the number of storage cells 150a, 150b may depend upon various design considerations. Such considerations may include, but are not limited to, the desired storage capacity and frequency with which the computer-readable data 140 is accessed. Still other considerations may include, by way of example, the physical dimensions of the storage system 101 and/or its components. Consequently, implementations in accordance with the invention are not to be regarded as being limited to use with any particular type or physical layout of storage system 101.

The storage system 101 may include one or more backplanes 170a, 170b. The hard disk drives 145 may be connected to the backplanes 170a, 170b for read and/or write operations. In one exemplary implementation, each library in the storage system 101 is provided with at least one backplane. However, in other implementations backplanes do not need to be included with each library.

Transfer robotics 160 may also be provided for transporting the hard disk drives 145 in the storage system 101. Transfer robotics 160 are generally adapted to retrieve hard disk drives 145 (e.g., from the storage cells 150a, 150b), transport the hard disk drives 145, and eject the hard disk drives 145 at an intended destination (e.g., backplane 170a, 170b).

Transfer robotics 160 may also be configured to establish a connection between a hard disk drive 145 and a backplane 170a, 170b. For example, the transfer robotics 160 may position the hard disk drive 145 adjacent one of the backplanes 170a, 170b so that a connector on the hard disk drive 145 is aligned with a mating connector on the backplane. The transfer robotics 160 may then eject the hard disk drive 145 onto the backplane with sufficient force so as to effect a connection.

Various types of transfer robotics 160 are readily commercially available, and embodiments of the present invention are not limited to any particular implementation. In addition, such transfer robotics 160 are well known and further description of the transfer robotics is not needed to fully understand or to practice the invention.

Automated storage system 101 may include a system controller 180 to processes management commands. For example, the system controller 180 may allocate the transfer robotics 160 and hard disk drives 145 as uniquely identified logical units or LUNs. Each LUN may comprise a contiguous range of logical addresses that can be addressed by mapping requests from the connection protocol used by the hosts 120a, 120b to the uniquely identified LUN. Accordingly, the system controller 180 may be operated to selectively activate hard disk drives 145 in the automated storage system 101. Of course the invention is not limited to LUN mapping and other types of mapping now known or later developed are also contemplated as being within the scope of the invention.

System controller 180 may be communicatively coupled, externally, to at least one of the hosts 120a, 120b and/or clients 110a, 110b. In an exemplary implementation, the hosts 120a, 120b are connected by I/O adapters 125a, 125b, such as, e.g., host bus adapters (HBA), to a switch 130. Switch 130 may be implemented as a SAN switch connected to the storage system 101, e.g., at the system controller 180. In any event, the hosts 120a, 120b and clients 110a, 110b have access to the hard disk drives 145 and transfer robotics 160 via the system controller 180.

System controller 180 may be communicatively coupled, internally, to transfer robotics 160 via robotics interface 165. In an exemplary implementation, the robotics interface 165 may be implemented as a small computer system interface (SCSI) controller. However, the invention is not limited to use with any particular type of robotics interface.

System controller 180 may also be communicatively coupled, internally, to backplane 170a, 170b. In an exemplary implementation, system controller 180 includes a controller interface 185 coupled to backplane interface 175a, 175b at the corresponding backplanes 170a, 170b. Accordingly, electrical signals generated at the hard disk drives 145 and system controller 180 may be converted to optical signals for transfer therebetween, as discussed in more detail below. Alternatively, the electrical data signals may be converted to other formats, such as infrared (IR), radio frequency (RF), or high speed electrical signals.

Figure 2:
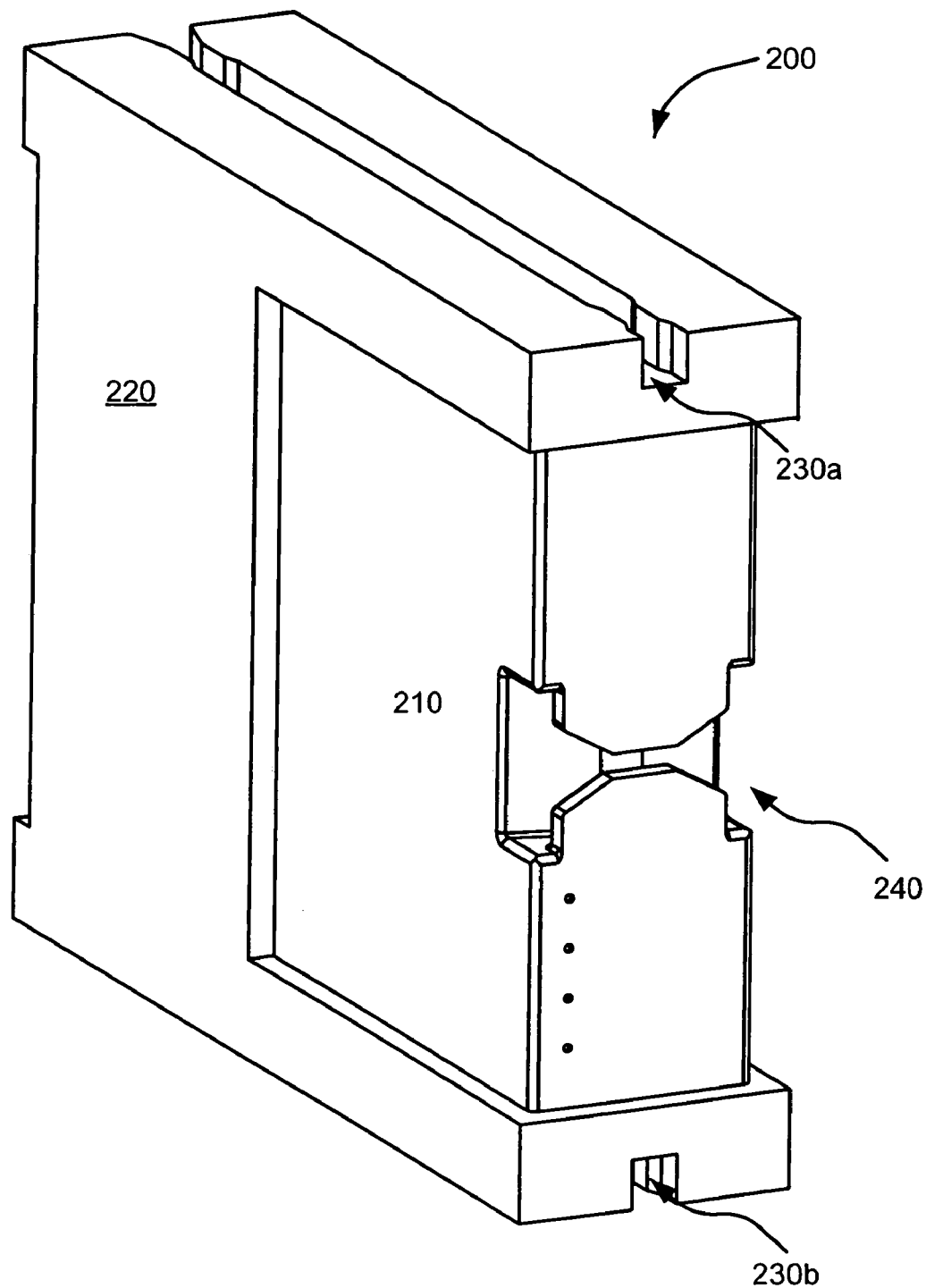
FIG. 2 is a perspective view of an exemplary storage media that may be used in an automated storage system.

FIG. 2 is a perspective view of an exemplary removable storage device 200. Removable storage device 200 may include one or more hard disk drive 210, such as, e.g., a serial advanced technology attachment (sATA) hard disk drive. Hard disk drive storage provides low-cost, high capacity, fast data access.

The exemplary removable storage device 200 may include a housing 220 for the hard disk drive 210. Guide channels 230a and 230b (hereinafter generally 230) may be formed in housing 220 and cooperate with mating guides (e.g., fins, not shown) that may be provided in the storage cells (e.g., storage cells 150a, 150b in FIG. 1) and at the backplane (e.g., backplane 170a, 170b in FIG. 1) to align and retain the hard disk drive 210.

Hard disk drive 210 may also include a connector (not shown) to link the hard disk drive 210 to a mating connector provided at the backplane for read and/or write operations. The connector may have multiple pins for data transfer, power, and ground. In addition, the connector may be a "hot swappable" connector so that the hard disk drive 210 can be readily connected without having to power down the backplane.

An exemplary connector may be implemented as a single connector attachment (SCA). SCA connectors provide a 68-pin data connection, 4-pin power connection, and configuration jumpers on a single 80-pin connector. However, the connector is not limited to any particular implementation.

Exemplary removable storage device 200 may also include a coupler 240 that is configured to be engaged by the transfer robotics (e.g., transfer robotics 160 in FIG. 1). Implementations of such a coupling system are described in more detail in co-owned U.S. Pat. No. 7,230,792, referenced above. It is noted, however, that the hard disk drives 210 for use with the present invention are not limited to any particular type of coupling system and other coupling systems now known or later developed may also be used.

Although the exemplary implementation shown in FIG. 2 only includes one hard disk drive in each carrier, in other implementations a plurality of hard disk drives may be provided in a single carrier.

Figure 3:
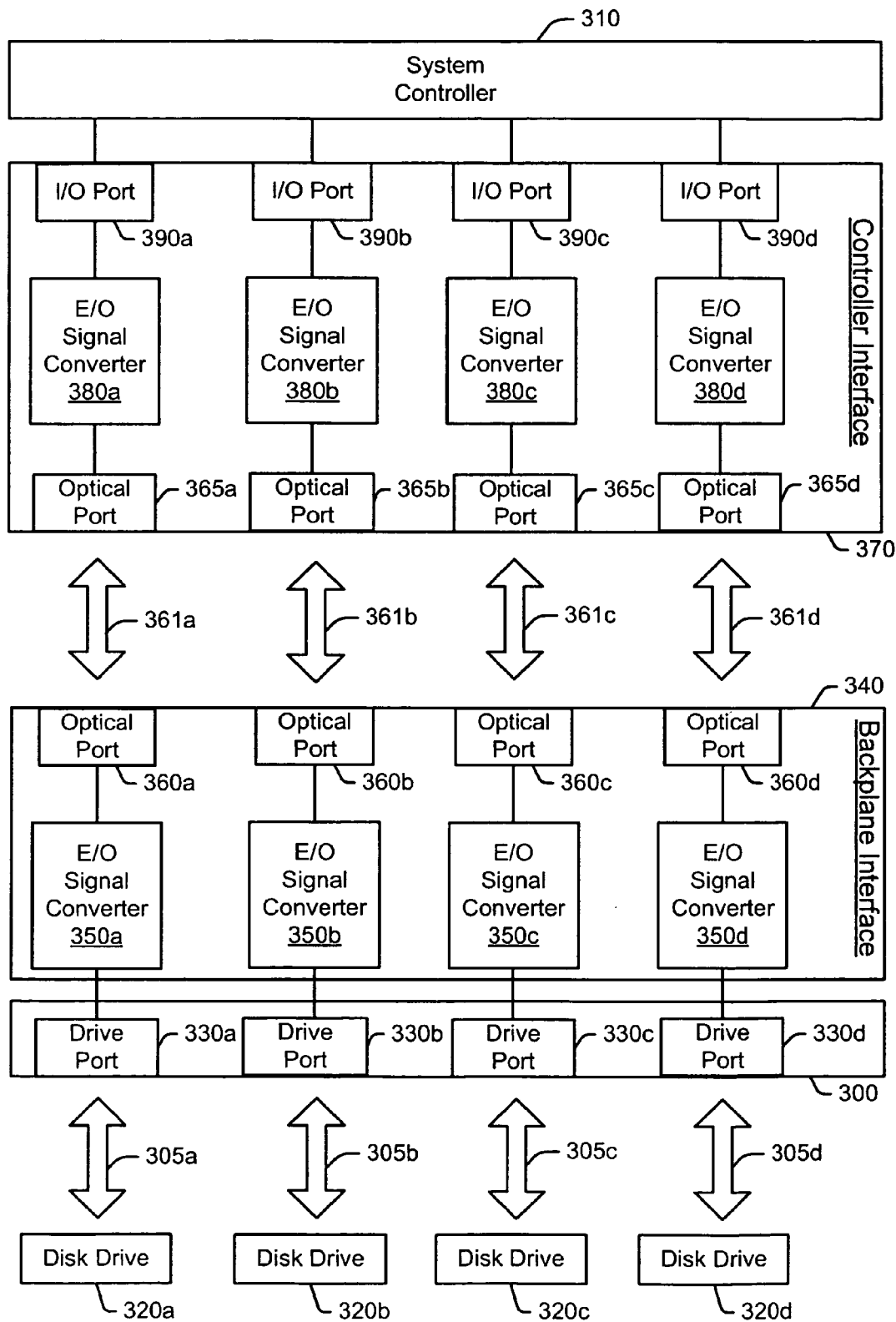
FIG. 3 is a functional diagram illustrating an exemplary implementation of electrical-optical signal conversion for an automated storage system.

FIG. 3 is a functional diagram illustrating an exemplary implementation of electrical-optical signal conversion for an automated storage system. A backplane 300 may be mounted in an automated storage system (e.g., the automated storage system 101 in FIG. 1). Backplane 300 may be communicatively coupled to a system controller 310 to communicate data and control signals with one or more hard disk drives 320 (hard disk drives 320a-d are shown in FIG. 3 for purposes of illustration).

Although the exemplary implementation shown in FIG. 3 includes hard disk drives 320 connected individually to the backplane 300, other implementations are also contemplated. For example, a plurality of hard disk drives 320 or disk set(s) may be linked (e.g., similar to RAID storage).

System controller 310 may include a processor (or processing units) and computer-readable storage or memory (e.g., dynamic random access memory (DRAM) and/or Flash memory) and may be implemented on a computer board. In an exemplary implementation, the system controller 310 employs a high-level packet protocol to exchange transactions in packets. The system controller 310 may also perform error correction on the packets to ensure that the data is correctly transferred between the hard disk drives 320 and the hosts and/or clients (e.g., hosts 120a,b and clients 110a,b in FIG. 1). The system controller 310 may also provide an ordering mechanism to support an ordered interface for proper sequencing of the transactions.

At least one drive port 330 (drive ports 330a-d are shown in FIG. 3 for purposes of illustration) may be provided to connect one or more hard disk drives 320 to the backplane 300, as illustrated by arrows 305a-d. Drive ports 330 may be implemented, e.g., as sATA interfaces to connect sATA-type hard disk drives, although it is noted that the drive ports 330a-d are not limited to any particular type of interface.

Backplane 300 is operatively associated with a backplane interface 340. Drive ports 330a-d on the backplane 300 may be electrically connected to electrical-optical signal converters 350 (signal converters 350a-d are shown in FIG. 3 for purposes of illustration) provided on the backplane interface 340. Signal converters 350 may be operated to convert electrical data signals from the hard disk drives 320 to optical signals. Signal converters 350 may also be operated to convert optical signals received at the backplane interface 340 to electrical data signals for delivery to the hard disk drives 310.

In an exemplary implementation, signal converters 350 may be implemented in hardware as fiber optic transmitters. Fiber optic transmitters are readily commercially available and convert electrical signals into optical signals. The fiber optic transmitter may include an interface circuit, a drive circuit, and an optical source. The interface circuit processes incoming electrical signals to make it compatible with the drive circuit. The drive circuit modulates the optical source by varying the current through the source. An optical source converts electrical current into light. Light emitted by an optical source is emitted onto an optical fiber for transmission. Circuitry may also be provided to convert optical signals to electrical signals. It is noted, however, that the signal converters 350 are not limited to any particular type of converters, and other converters now known or later developed may also be used.

Signal converters 350 may be linked to optical ports 360 to optically couple the backplane interface 340 to optical ports 365 provided at a controller interface 370 for the system controller 310, as illustrated by arrows 361a-d in FIG. 3. Optical coupling may include, e.g., fiber channel technology, although other optical bus formats may also be used.

Controller interface 370 may also include one or more electrical-optical signal converters 380 (signal converters 380a-d are shown in FIG. 3 for purposes of illustration). Signal converters 380 may be implemented similarly to signal converters 350 on backplane interface 340. Signal converters 380 may be operated to convert optical signals received at the controller interface 370 into electrical signals for the system controller 310. Signal converters 380 may also be operated to convert electrical signals from the system controller 310 into optical data signals for delivery to the backplane interface 340.

Signal converters 380 are electrically connected to the system controller 310 via I/O ports 390a-d. I/O ports 390a-d facilitate data transfer between the controller interface 370 and system controller 310.

It is noted that, although the backplane interface 340 may be provided in close proximity to the backplane 300 (e.g., within 18 inches for sATA format), the backplane interface 340 does not need to be physically mounted to the backplane 300. Likewise, the controller interface may be provided in close proximity to the system controller 310, but does not need to be physically mounted to the system controller 310.

It is further noted that the backplane interface 340 and controller interface 370 are not limited to the implementation shown in FIG. 3. For example, a plurality of drive ports 330 may be connected via a multiplexer (not shown) to a single signal converter 350 on the backplane interface 340. Likewise, a plurality of I/O ports 390 may be connected via a multiplexer (not shown) to a single signal converter 380 on the controller interface 370. In other exemplary implementations, signal converter(s) may be provided with integrated ports.

Backplane 300 (or the backplane interface 340) and system controller 310 (or the controller interface 370) may also include auxiliary components (not shown), such as, e.g., power supplies. Auxiliary components are well understood in the art and further description is not necessary to fully understand or to enable the invention.

It is noted that the invention is not limited to use with optical signals. For example, in other implementations, the electrical data signals may be converted to other formats, such as infrared (IR), radio frequency (RF), or high speed electrical signals, or other signal formats now known or later developed. Suitable conversion circuitry may be provided to convert the electrical data signals to other signal formats and vice versa.

Exemplary Operations

Figure 4:
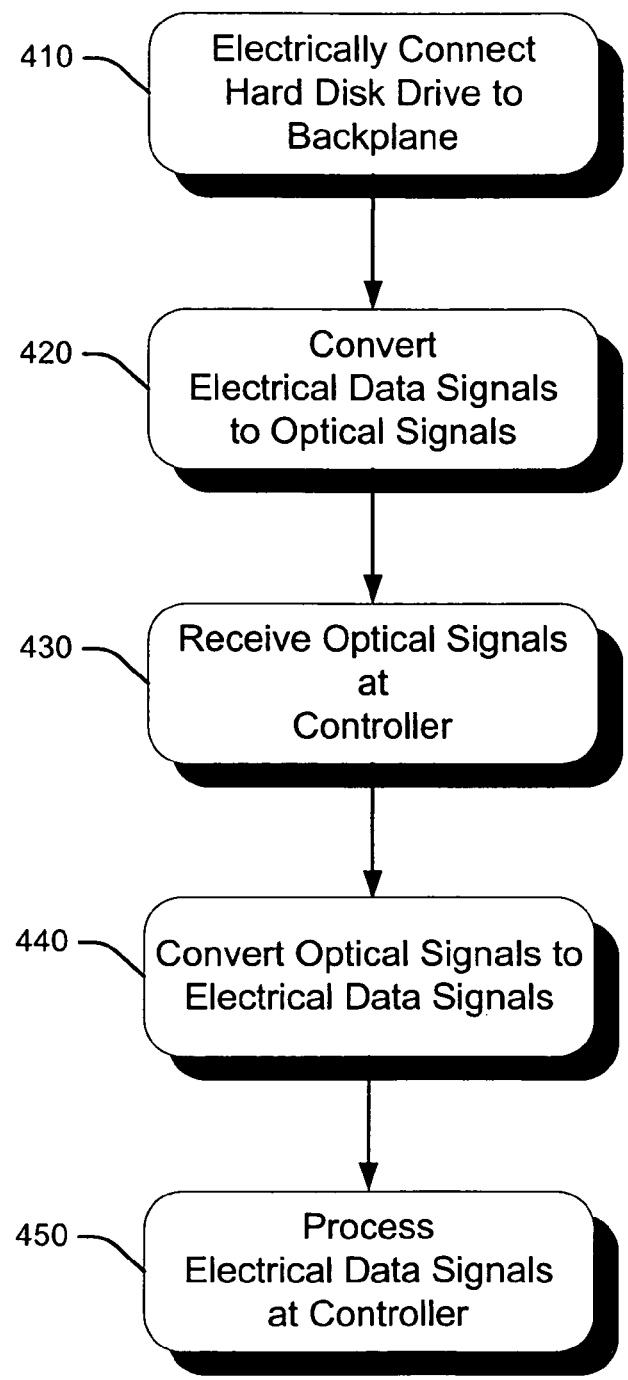
FIG. 4 is a flowchart of exemplary operations to implement electrical-optical signal conversion for an automated storage system.

FIG. 4 illustrates exemplary operations 400 to convert electrical data signals generated at a hard disk drive into optical signals for delivery to a system controller in an automated storage system (e.g., the automated storage system 101 in FIG. 1). In operation 410, a hard disk drive is electrically connected to a backplane in the automated storage system. In operation 420, electrical data signals from the hard disk drive are converted to optical signals, for example, using signal converter circuitry described above. The optical signals may then be delivered via an optical network to the system controller. In operation 430, the optical signals are received at the system controller. The optical signals are converted to electrical data signals in operation 440. In operation 450, the electrical data signals are processed at the system controller, such as, e.g., for read/write operations at the hard disk drive.

Figure 5:
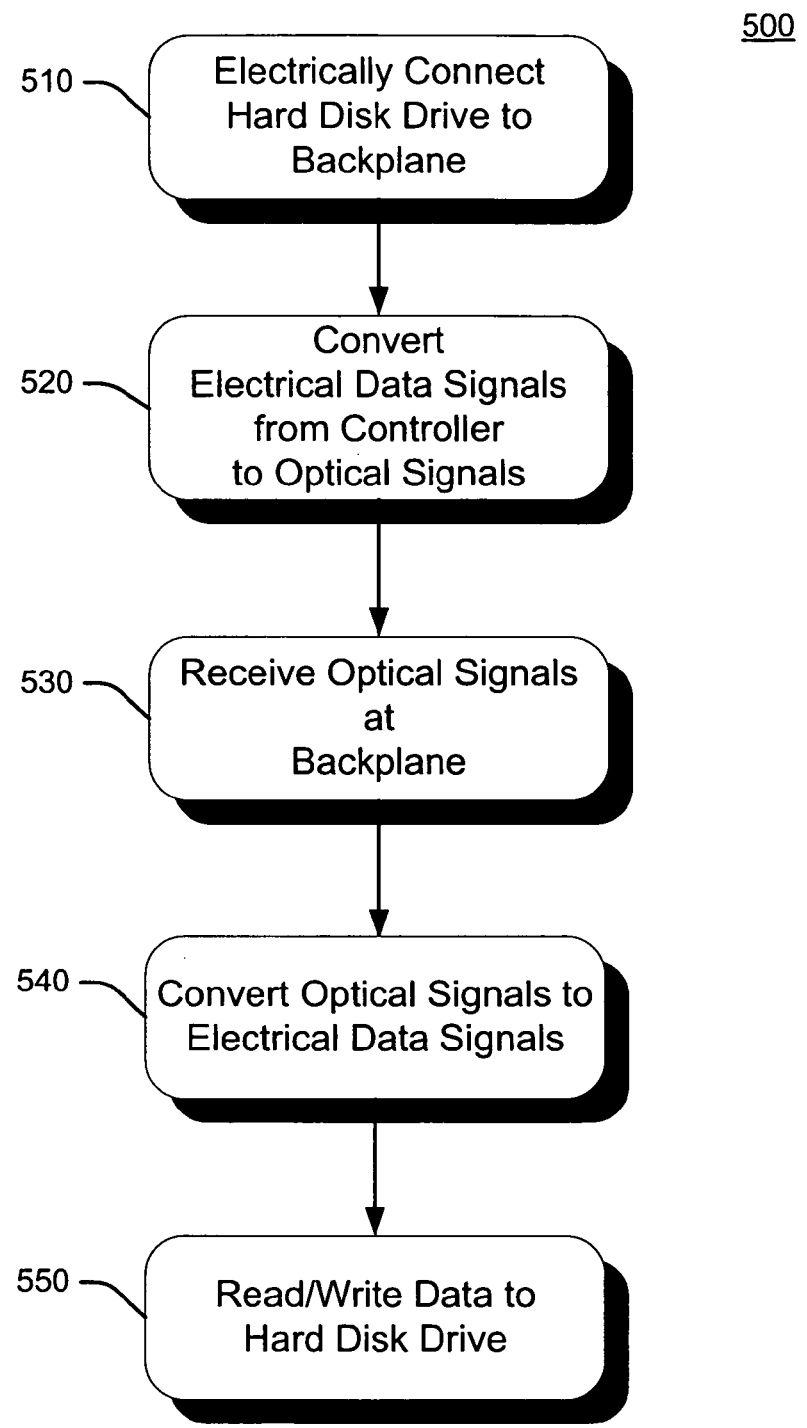
FIG. 5 is another flowchart of exemplary operations to implement electrical-optical signal conversion for an automated storage system.

FIG. 5 illustrates exemplary operations 500 to convert electrical data signals generated at a system controller into optical signals for delivery to a hard disk drive in an automated storage system (e.g., the automated storage system 101 in FIG. 1). In operation 510, a hard disk drive is electrically connected to a backplane in the automated storage system. In operation 520, electrical data signals from the system controller are converted to optical signals, for example, using signal converter circuitry described above. The optical signals may then be delivered via an optical network to the hard disk drive (e.g., connected to the backplane in operation 510). In operation 530, the optical signals are received at the backplane. The optical signals are converted to electrical data signals in operation 540. In operation 550, the electrical data signals are used to write data to the hard disk drive, such as, e.g., for a backup operation.

It is noted that the exemplary operations shown and described with reference to FIG. 4 and FIG. 5 are not intended to limit the scope of the invention to any particular order. In addition, other implementations are also contemplated, as will be readily apparent to those skilled in the art after having become familiar with the teachings of the invention.

Alternative Implementations

Figure 6:
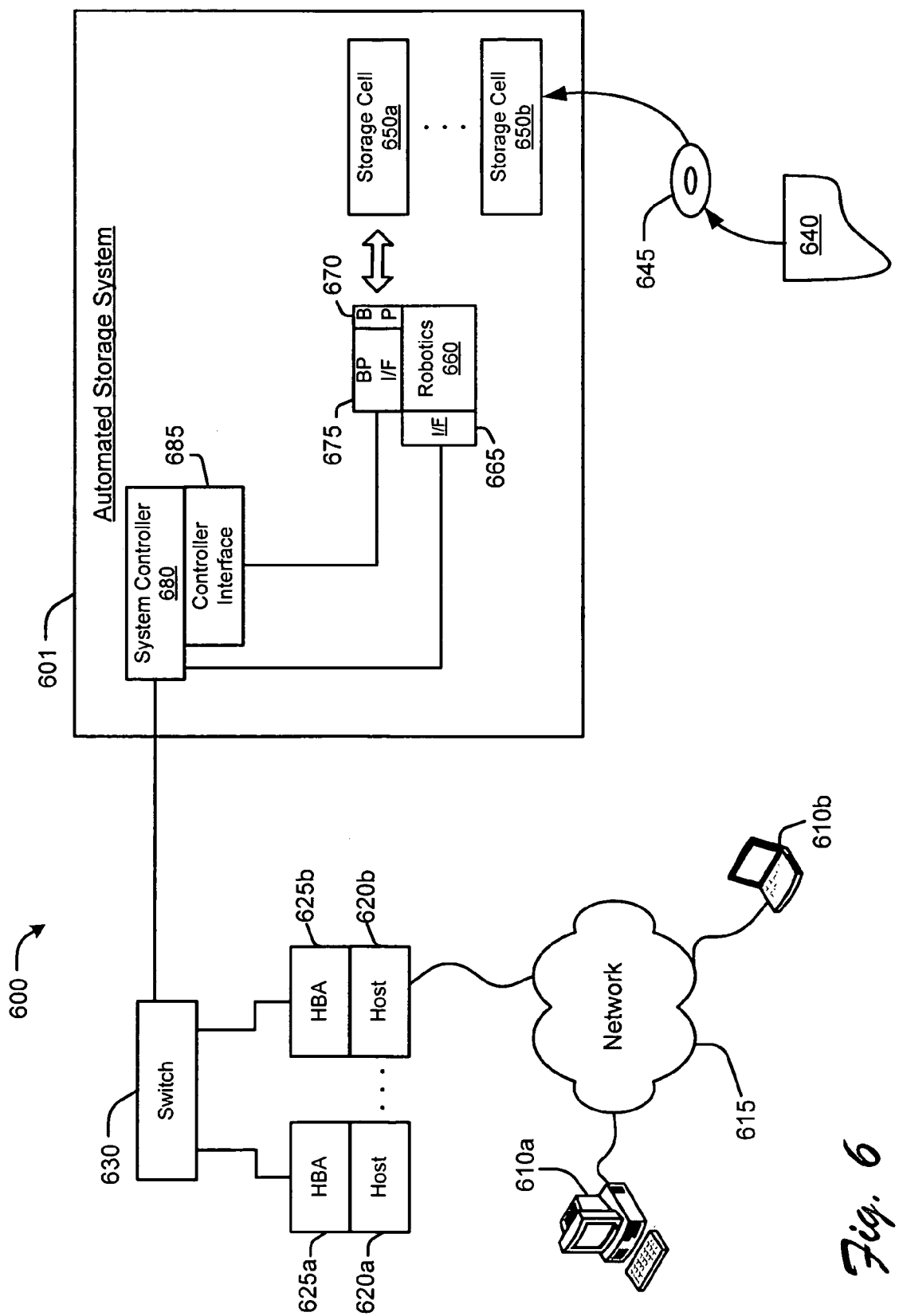
FIG. 6 is a schematic illustration of an alternative automated storage system.
Figure 7:
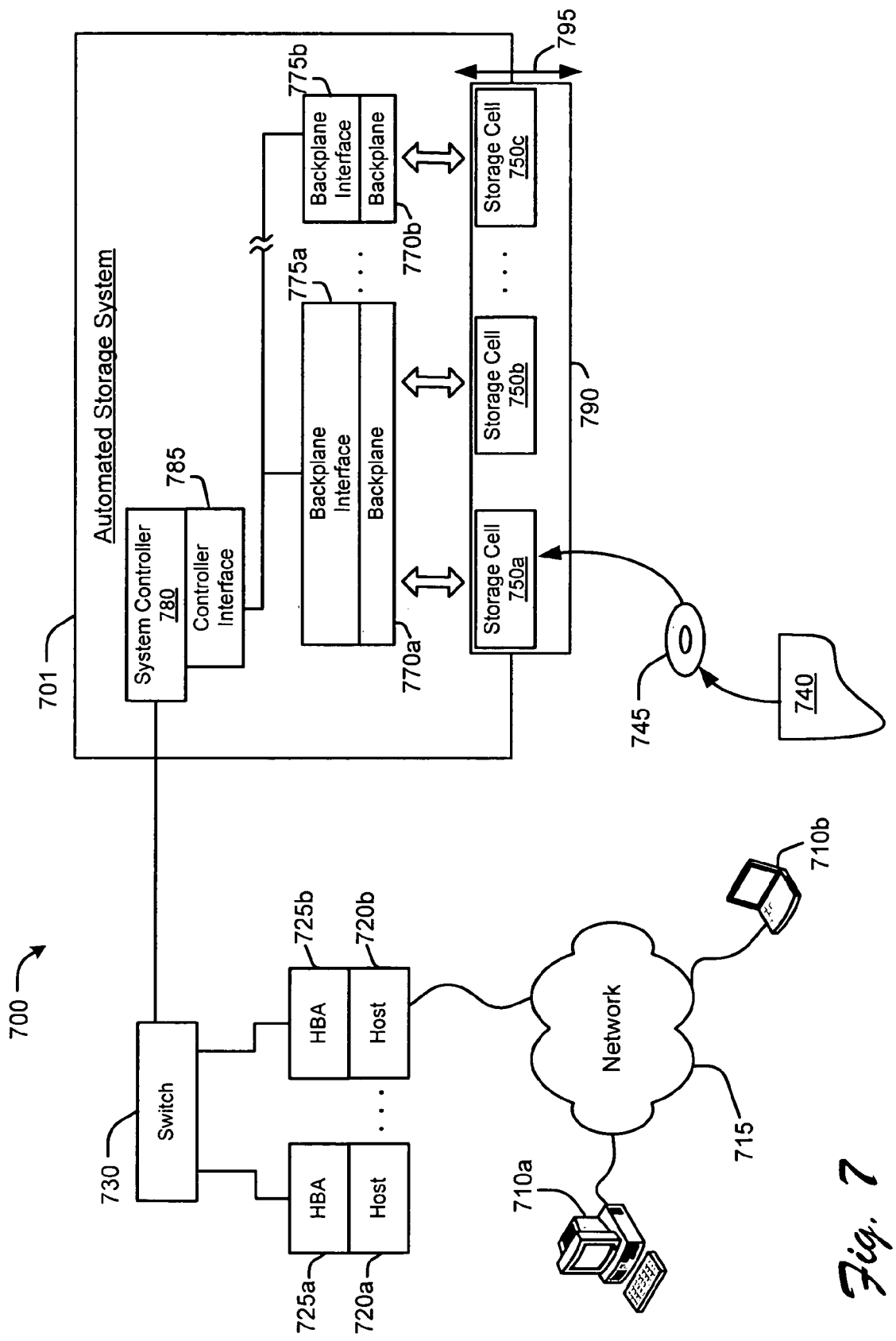
FIG. 7 is a schematic illustration of another alternative automated storage system.

FIGS. 6 and 7 are schematic illustrations of alternative implementations of automated storage systems. To the extent FIGS. 6 and 7 correspond to FIG. 1, like elements are identified using corresponding 600-series reference numerals in FIG. 6 and corresponding 700-series reference numerals in FIG. 7.

With reference to FIG. 6, an automated storage system 601 includes robotics assembly 660 having a backplane 670 mounted thereto. A backplane interface 675 is operatively associated with the backplane 670. Although only one robotics assembly 660 is shown in FIG. 6, it is noted that additional robotics assemblies may also be provided as a matter of design choice.

The backplane 670 may be mounted to robotics assembly 660 in any suitable manner to position the backplane 670 adjacent the hard disk drives 645 in the storage cells 650a, 650b. In an exemplary implementation, the robotics assembly 660 may move the backplane 670 toward the storage cells 650a, 650b to effect an electrical connection between the backplane 670 and the hard disk drives 645.

Alternatively, the robotics 660 may be operated to position the backplane 670 adjacent the storage cells 650a, 650b. One or more of the storage cells 650a, 650b may then be moved toward the backplane 670 to effect an electrical connection between the backplane 670 and the hard disk drives 645.

As discussed in more detail above, backplane interface 675 converts electrical signals from the hard disk drives 645 to optical signals for delivery to the system controller 680 (e.g., via controller interface 685). Optical signals received at the backplane interface 675 may also be converted to electrical signals for delivery to the hard disk drives 645.

With reference to FIG. 7, one or more backplanes 770a, 770b may be mounted in the automated storage system 701. Backplane interface(s) 775a, 775b may be operatively associated with the backplane(s) 770a, 770b. It is noted that any number of backplanes 770a, 770b may be provided as a matter of design choice.

One or more storage cells 750a, 750b, 750c may be mounted to one or more drawers 790. Drawer(s) 790 are movably mounted to the automated storage system 701, e.g., to slide in and out of the automated storage system 701. In an exemplary implementation, the drawer 790 may be operated to move the hard disk drives 745 toward the backplane 770a, 770b to effect an electrical connection between the backplane 770a, 770b and the hard disk drives 745 in the drawer 790. System controller 780 may be operated to selectively activate the hard disk drives in the drawer, e.g., based on user access requests from the hosts 720a, 720b and/or clients 710a, 710b.

As discussed in more detail above, backplane interface 775a, 775b converts electrical signals from the hard disk drives 745 to optical signals for delivery to the system controller 780. Optical signals received at the backplane interface 775 may also be converted to electrical signals for the hard disk drives 745.

It is noted that the exemplary implementations shown and described with reference to FIGS. 6 and 7 are merely illustrative of alternative automated storage systems. Other implementations and variations of these implementations are also contemplated.

In addition to the specific implementations explicitly set forth herein, other aspects and implementations will also be apparent to those skilled in the art from consideration of the specification disclosed herein. It is intended that the specification and illustrated implementations be considered as examples only, with a true scope and spirit of the following claims.

The invention claimed is

1. An automated storage system comprising:
a plurality of storage cells for removable hard disk drives;
a backplane including at least one electrical connection to connect the removable hard disk drives to the backplane;
transfer robotics operable to access the removable hard disk drives in the storage cells and electrically connect the removable hard disk drives to the backplane via the at least one electrical connection; and
a backplane interface operable to convert electrical data signals from the removable hard disk drives electrically connected at the backplane to optical signals for delivery to a system controller.

2. The automated storage system of claim 1 wherein the transfer robotics are operable to transport the backplane to the removable hard disk drives.

3. The automated storage system of claim 1 wherein the transfer robotics are operable to transport the removable hard disk drives to the backplane.

4. The automated storage system of claim 1 wherein the system controller activates the removable hard disk drives for user access via an external port.

5. The automated storage system of claim 1 wherein the backplane interface is operable to convert optical signals received from the system controller into electrical data signals for the removable hard disk drives.

6. The automated storage system of claim 1 further comprising a controller interface operable to convert optical signals received from the backplane interface to electrical data signals for processing at the system controller.

7. The automated storage system of claim 1 further comprising a controller interface operable to convert electrical signals from the system controller to optical signals for delivery to the backplane interface.

8. The automated storage system of claim 1, further comprising a plurality of drive ports mounted to the backplane, each drive port configured to receive electrical data signals from the hard disk drive media electrically connected to the backplane.

9. The automated storage system of claim 1, wherein the backplane interface is optically coupled to a controller interface at the system controller.

10. An automated storage system comprising:
a drawer having a plurality of storage cells for removable hard disk drives;
a backplane provided adjacent the drawer;
at least one electrical connection mounted on the backplane, the electrical connection electrically connecting the removable hard disk drives to the backplane when the drawer is in a closed position;
a system controller optically coupled to the backplane; and
a backplane interface operable to convert electrical data signals from the removable hard disk drives electrically connected at the backplane to optical signals for delivery to the system controller.

11. The automated storage system of claim 10 wherein the system controller selectively activates the removable hard disk drives for user access via an external port.

12. The automated storage system of claim 10 wherein the backplane interface converts optical signals received from the system controller into electrical data signals for the removable hard disk drives.

13. The automated storage system of claim 10 further comprising a controller interface to convert optical signals received from the backplane interface to electrical data signals for processing at the system controller.

14. The automated storage system of claim 10 further comprising a controller interface to convert electrical data signals from the system controller to optical signals for delivery to the backplane interface.

* * * * *